(12) United States Patent
Micewicz

(10) Patent No.: US 9,156,502 B2
(45) Date of Patent: Oct. 13, 2015

(54) VEHICLE BONNET SAFETY ASSEMBLY

(71) Applicant: ADVANCED DIGITAL BROADCAST S.A, Geneva (CH)

(72) Inventor: Jaroslaw Micewicz, Zielona Gora (PL)

(73) Assignee: Advanced Digital Broadcast S.A., Chambesy (CH)

( * ) Notice: Subject to any disclaimer, the term of this patent is extended or adjusted under 35 U.S.C. 154(b) by 0 days.

(21) Appl. No.: 14/517,969

(22) Filed: Oct. 20, 2014

(65) Prior Publication Data

US 2015/0107926 A1    Apr. 23, 2015

(30) Foreign Application Priority Data

Oct. 21, 2013  (EP) ..................................... 13189457

(51) Int. Cl.
  *B60R 21/38* (2011.01)
  *B60R 22/00* (2006.01)
  *E05C 17/00* (2006.01)
  *B62D 25/12* (2006.01)

(52) U.S. Cl.
  CPC ................ *B62D 25/12* (2013.01); *B60R 21/38* (2013.01); *B60R 22/00* (2013.01); *E05C 17/00* (2013.01)

(58) Field of Classification Search
  CPC .......... B62D 25/12; E05C 17/00; B60R 21/28
  See application file for complete search history.

(56) References Cited

U.S. PATENT DOCUMENTS

| | | | |
|---|---|---|---|
| 2002/0033286 A1* | 3/2002 | Brogly et al. | 180/69.2 |
| 2004/0113459 A1* | 6/2004 | Mattsson et al. | 296/187.04 |
| 2004/0182629 A1* | 9/2004 | Takahashi et al. | 180/274 |
| 2005/0000744 A1* | 1/2005 | White et al. | 180/69.2 |
| 2005/0264036 A1* | 12/2005 | Kramarczyk et al. | 296/187.03 |
| 2005/0279550 A1* | 12/2005 | Saville et al. | 180/69.21 |
| 2006/0290172 A1* | 12/2006 | Hirata et al. | 296/187.04 |
| 2009/0229901 A1* | 9/2009 | Aoki et al. | 180/69.21 |
| 2009/0302644 A1* | 12/2009 | Mori et al. | 296/193.11 |
| 2014/0132036 A1* | 5/2014 | Fritzon | 296/193.11 |

* cited by examiner

*Primary Examiner* — Drew Brown
(74) *Attorney, Agent, or Firm* — Mark M. Friedman

(57) ABSTRACT

A vehicle bonnet safety assembly, the vehicle comprising: a bonnet; a windscreen; a chassis, to which the bonnet is hingedly joined by means of actuators; the assembly further comprises: an elongated guide fixedly mounted, and supported along its length, on the bottom side of the bonnet; a sliding member provided inside the elongated guide to slide along the length of the elongated guide until it engages a stop coupled to the elongated guide; whereas the sliding member is mounted in the elongated guide such that it is prevented from sliding out and sliding back the elongated guide thereby creating a field of visibility on the road for a driver when the bonnet flips over the windscreen.

4 Claims, 4 Drawing Sheets

VEHICLE BONNET SAFETY ASSEMBLY

DESCRIPTION

The present invention relates to vehicle bonnet safety assembly, in particular for typical cars.

The present technical concept addresses situations where a vehicle bonnet flips over the windscreen during an accidental opening or traffic accident. As it appears, despite typical latch mechanisms provided by vehicle manufacturers in the front-middle section of a bonnet, accidental bonnet opening happens in practice. Hence, what is required is a means to address safety issues during an accident when the first locking means fails.

Bonnet safety assembly must thus address two major concerns that are first to prevent opening of the bonnet and second, if the opening is unavoidable, to provide means allowing for such opening of the bonnet that will not result in the driver's line of sight being blocked by the opened bonnet.

A prior art publication U.S. Pat. No. 2,333,467A entitled "Hood control for motor cars" discloses a latching mechanism wherein the hood is locked down at four points. When the car arrives at the filling station for service, the driver releases the hood by actuation of lever.

The '467 publication does not address the safety issues during an accident when the first locking means fails.

Another prior art publication U.S. Pat. No. 3,905,624A entitled "Hood latching device for automotive vehicles" discloses that if a spring urging the hooked latch member toward the closed position happens to be broken at that time as a result of fatigue or the like, there will still be a possibility of the hood cover being fly-opened under the action of another spring provided in the first latch mechanism or the action of a rubber damper provided on the vehicle body as the first latch mechanism is released. Since the opening of the hood cover deprives the driver of forward visibility almost entirely, such an accident is extremely dangerous particularly when the vehicle is being driven at a high speed.

Therefore '624 provides a hood latching device comprising a first latch mechanism and a second latch member having a hooked member whereby the above described drawback of the conventional latching device is substantially eliminated by an improved hood latching device wherein the releasing movement of the hooked member of the second latching mechanism is prevented by a member cooperating with the first latching mechanism, and the possibility of accidental release of the second latch mechanism is thereby substantially eliminated.

The disadvantage of the known solution is that in some cases the arrangement is insufficient to hold the bonnet that may flip onto the windscreen thereby obscuring visibility for a driver.

It would be thus desirable to provide an improved vehicle bonnet safety assembly. Preferably such method and system shall improved protection and in case of failure allow visibility of the road for a driver.

The object of the present invention is a vehicle bonnet safety assembly, the vehicle comprising: a bonnet; a windscreen; a chassis, to which the bonnet is hingedly joined by means of actuators; the assembly further comprises: an elongated guide fixedly mounted, and supported along its length, on the bottom side of the bonnet; a sliding member provided inside the elongated guide to slide along the length of the elongated guide until it engages a stop coupled to the elongated guide; whereas the sliding member is mounted in the elongated guide such that it is prevented from sliding out and sliding back the elongated guide thereby creating a field of visibility on the road for a driver when the bonnet flips over the windscreen.

Preferably, the actuators are mounted such that they are prevented from detaching from the sliding member.

Preferably, the actuators are pneumatic actuators wherein in each actuator a pneumatic valve allows the flow of a medium when the bonnet is being opened with a force below a threshold and prevents the flow of a medium when the bonnet is being opened with a force above a threshold.

Preferably, the mechanism for prevention of sliding back has a form of one or more locking elements that allow only one direction movement.

Preferably, the mechanism for prevention of sliding back comprises at least one locking pawl.

The present invention is shown by means of exemplary embodiments on a drawing, in which:

FIG. 1 presents a schematic diagram of an assembly according to the present invention;

FIGS. 2A-2B present a schematic diagram of an enhancement of the assembly according to the present invention;

In a moving vehicle, any object on or in the vehicle has its own inertia. In case of an accident the inertia forces of different objects of the above are independent. The vehicle may be brought to an abrupt stop while its bonnet, thrown in an opposite direction, may flip over the vehicle's windscreen thereby obscuring the view on the road.

Figure 1:
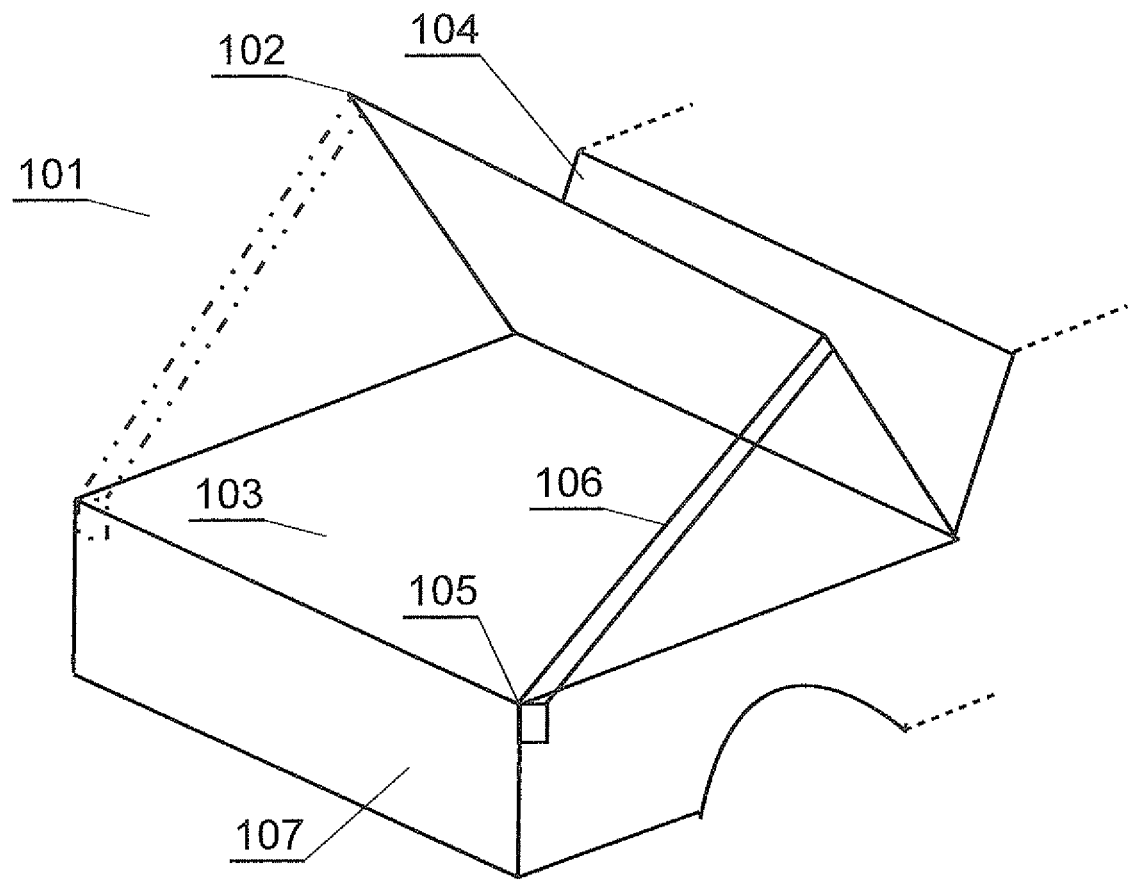

In FIG. 1 there is shown a carts (101) bonnet (105, 106) restraining mechanism, which includes a retractable strap (106) which is secured to a retraction mechanism (105) further secured to the car's chassis (107) or frame at one end and is secured to the car's bonnet (102) at an opposite end.

The bonnet (102) is also hingedly joined with the chassis of the vehicle in order to provide normal opening function.

The restraining mechanism at the car's chassis or frame end comprises the retraction mechanism (105) coupled to an inertia reel in the present embodiment located in the area typical for a headlight (the location may differ and the inertia reel may be mounted on (fastened to) the left of right side of the vehicle or at the front of the vehicle). The inertia reel mechanism may be such as the one disclosed in "Inertia reel mechanisms"—U.S. Pat. No. 3,578,260 A or "Inertia locking retractor"—U.S. Pat. No. 3,917,189 A or similar, allowing for a strap or belt to be automatically locked against extension when the bonnet rapidly moves relative to the vehicle's engine compartment with an acceleration above a predetermined acceleration.

Such strap has the ability to extend and retract. The bonnet (102) may be opened easily when the strap is extended with a low to moderate force below a predetermined threshold, but in case a strong force is applied, above the predefined threshold, the strap will instantly tighten up and hold the bonnet secured in place (i.e in proximity to the engine compartment) and preventing it from flipping onto the windscreen (104).

In other words, the retractable strap (106) is allowed to extend in case a force below a predetermined threshold is applied and retractable strap (106) is prevented from extending when a force above the predefined threshold is applied.

There may be installed one or two bonnet restraining mechanism on the left and right side of the bonnet (102) accordingly.

It is also to be noted that the strap has to have suitable strength to hold the opening bonnet when the bonnet rapidly accelerates and subsequently decelerates. Nevertheless, different materials and different width and/or thickness of the strap may be applied.

Figure 2A:
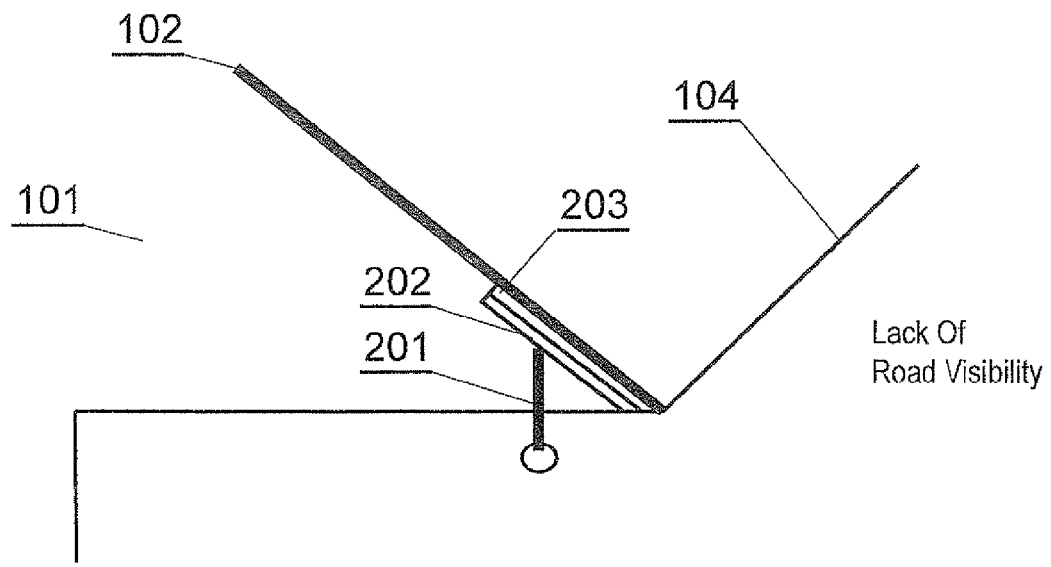

FIG. 2A presents a schematic diagram of an enhancement of the assembly according to the present invention. The enhancement is to ensure driver's visibility of the road in case bonnet opening prevention mechanisms have failed.

The car's (101) bonnet (102) may be opened and subsequently supported with two actuators (201) such as pneumatic actuators. There are typically two of such actuators (201), positioned on the left and right side of the bonnet (102), connecting the bonnet (102) with the chassis.

The present invention introduces a mechanism between the top end of the actuator (201) and the bonnet (102). The mechanism includes an elongated guide (203) fixedly mounted, and supported along its length, on the bottom side of the bonnet (102). A sliding member (202) is provided inside the elongated guide (203) to slide along the length of the elongated guide (203) until it engages a stop (shown in details in FIGS. 4B-4C) coupled to the elongated guide (203). The sliding member (202) is mounted in the elongated guide (203) such that it will never slide out of the elongated guide (203) (the sliding member is prevented from sliding out of the elongated guide).

Figure 2B:
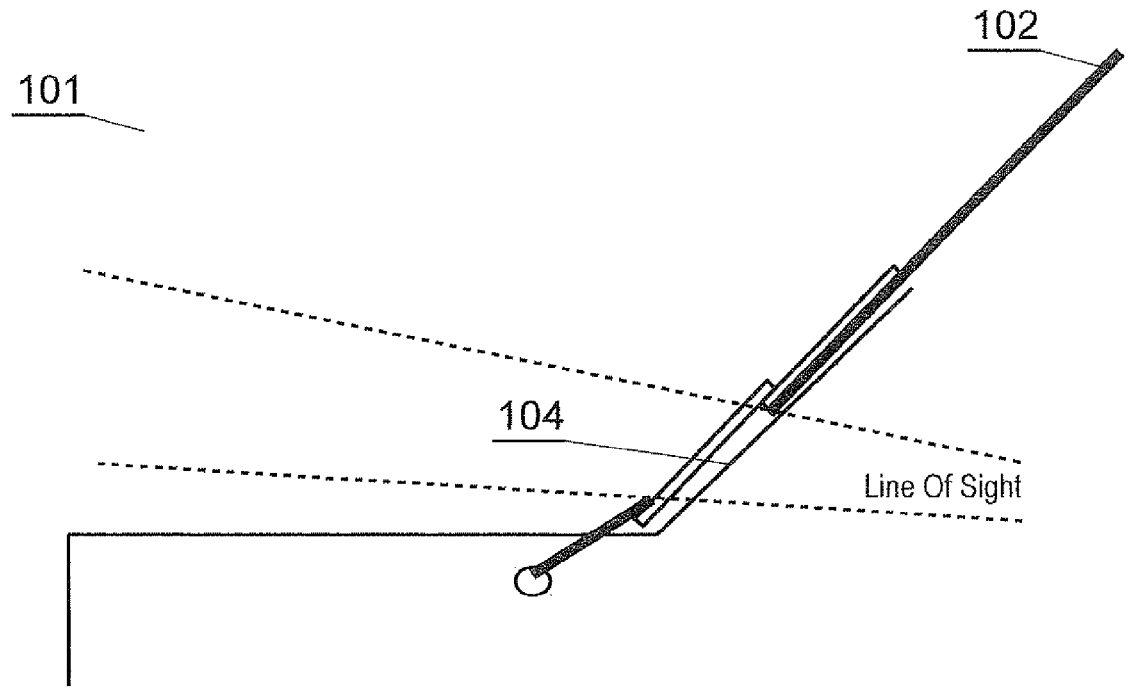

Once the sliding member (202) reaches the stop, it will be prevented from sliding back the elongated guide (203), thereby creating a field of visibility on the road for the driver as shown in FIG. 2B, when the bonnet flips over the windscreen. The mechanism for prevention of sliding back may have a form of a latch.

The obtained field of visibility may be different depending on the length of the applied sliding member (202) and the elongated guide (203).

Accordingly, the actuators (201) are mounted such that they will never detach from the sliding member (202) (they are prevented from detaching from the sliding member (202) by means of for example screws).

Figure 3:
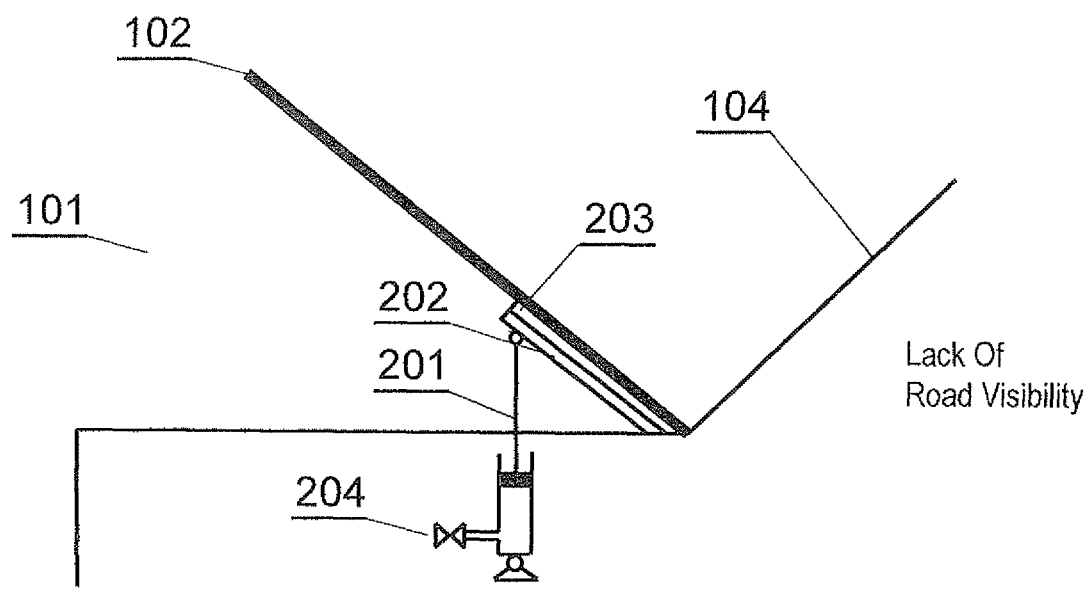
FIG. 3 depicts an actuator of the assembly according to the present invention.

FIG. 3 depicts an actuator of the assembly according to the present invention. A hydraulic or pneumatic actuator (201) is attached to the bonnet (102). The pneumatic actuator arrangement is shown in FIG. 3 schematically by means of the two triangles (204). A pneumatic valve limits a flow of a medium when the bonnet (102) is being opened with a normal speed and does not cause excessive hindrance on opening.

However, when the bonnet (102) is opened rapidly, the valve will close the flow of the medium in a piston thereby disabling the possibility of opening the bonnet (102).

In other words, in each actuator (201) a pneumatic valve allows the flow of a medium when the bonnet (102) is being opened with a force below a threshold and prevents the flow of a medium when the bonnet (102) is being opened with a force above a threshold.

The valve may be external or internal (inside the piston). Optionally the pistons may be equipped with a safety valves disabling opening of the bonnet (102).

Figure 4A:
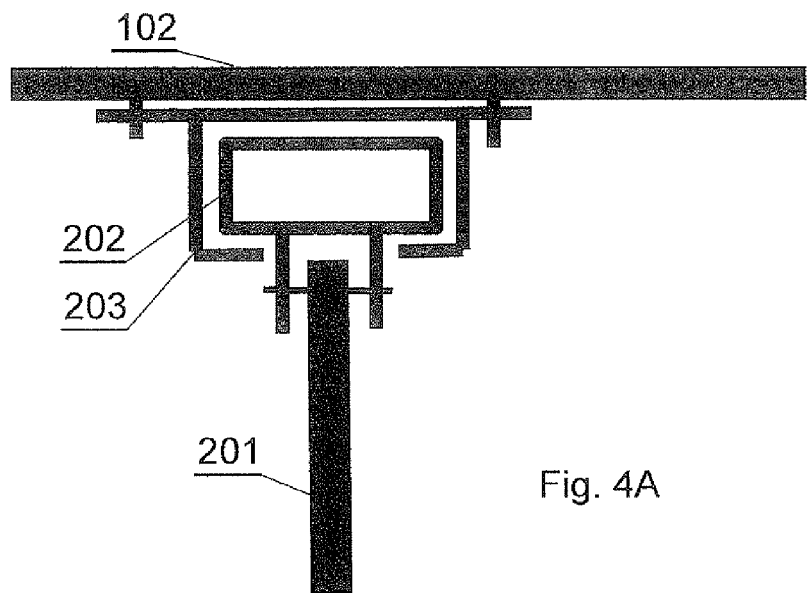
FIGS. 4A-4C depict a guide mechanism with a stop of the sliding member according to the present invention.
Figure 4B:
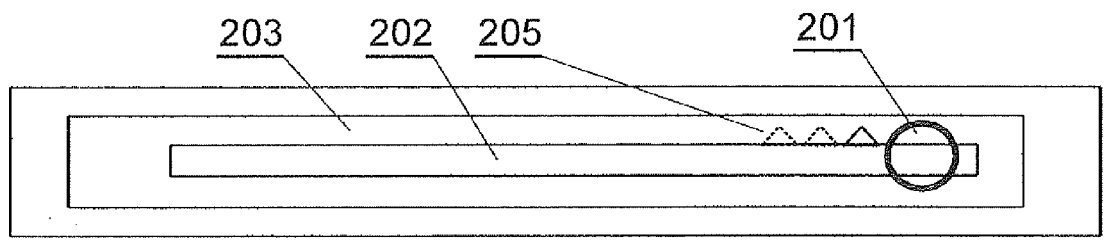
Figure 4C:
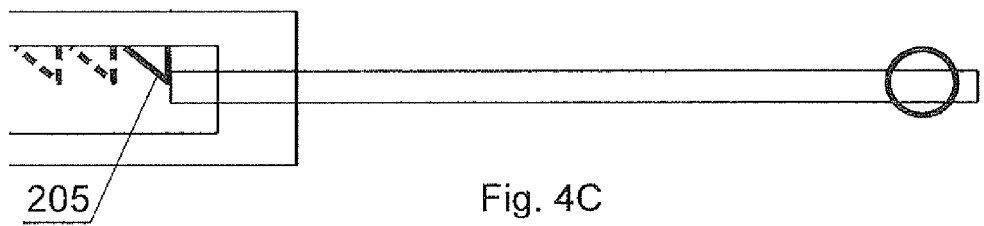

FIGS. 4A-4C depict a guide mechanism with a stop of the sliding member according to the present invention. The elongated guide (203) is fixedly mounted, and supported along its length, on the bottom side of the bonnet (102). A sliding member (202) is provided to slide along the length of the elongated guide (203). The sliding member (202) slidably moves within the elongated guide (203).

The mechanism for prevention of sliding back 205 may have a form of one or more locking elements that allow only one direction movement such as a locking pawl. The mechanism for prevention of sliding back 205 is shown in its disabled state in FIG. 4B and in its enabled state in FIG. 4C.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

In addition, any combination of the appended claims in envisaged in the present application.

The invention claimed is:

1. A vehicle bonnet safety assembly, the vehicle comprising:
   a bonnet (102);
   a windscreen;
   a chassis (107), to which the bonnet (102) is hingedly joined by means of actuators (201);
   the assembly being characterized in that it comprises:
   an elongated guide (203) fixedly mounted, and supported along its length, on the bottom side of the bonnet (102);
   a sliding member (202) provided inside the elongated guide (203) to slide along the length of the elongated guide (203) until it engages a stop coupled to the elongated guide (203);
   whereas the sliding member (202) is mounted in the elongated guide (203) such that it is prevented from sliding out and sliding back the elongated guide (203) thereby creating a field of visibility on the road for a driver when the bonnet flips over the windscreen,
   wherein prevention of sliding back (205) has a form of one or more locking elements that allow only one direction movement.

2. The assembly according to claim 1, characterized in that the actuators (201) are mounted such that they are prevented from detaching from the sliding member (202).

3. The assembly according to claim 2, characterized in that the actuators (201) are pneumatic actuators wherein in each actuator (201) a pneumatic valve allows the flow of a medium when the bonnet (102) is being opened with a force below a threshold and prevents the flow of a medium when the bonnet (102) is being opened with a force above a threshold.

4. The assembly according to claim 1, characterized in that the mechanism for prevention of sliding back (205) comprises at least one locking pawl.

* * * * *